United States Patent
Stahr

[15] 3,671,410

[45] June 20, 1972

[54] METHOD FOR MAKING METAL OXIDE MEMBRANES

[72] Inventor: Henry M. Stahr, Ames, Iowa

[73] Assignee: Philip Morris Incorporated, New York, N.Y.

[22] Filed: Feb. 16, 1970

[21] Appl. No.: 11,785

[52] U.S. Cl. ................................................. 204/56, 204/58
[51] Int. Cl. ................................................. C23b 9/00
[58] Field of Search .......................... 204/56, 58, 12, 13

[56] References Cited

UNITED STATES PATENTS

| | | | |
|---|---|---|---|
| 3,322,654 | 5/1967 | Jonkers et al. | 204/12 |
| 3,089,235 | 5/1963 | Boulet et al. | 204/12 |
| 3,023,149 | 2/1962 | Zeman | 204/58 |

FOREIGN PATENTS OR APPLICATIONS

| | | | |
|---|---|---|---|
| 1,131,481 | 6/1962 | Germany | 204/58 |
| 893,505 | 9/1953 | Germany | 204/12 |

*Primary Examiner*—John H. Mack
*Assistant Examiner*—R. L. Andrews
*Attorney*—Watson, Leavenworth & Kelton

[57] ABSTRACT

Metal oxide membranes are produced by anodization of selected metals capable of forming coherent but porous oxide films. The remaining unoxidized metal is removed by reaction with bromine or ammonium bromide leaving a flexible, mechanically strong metal oxide film of about 300 to 20,000 A. thickness.

9 Claims, No Drawings

METHOD FOR MAKING METAL OXIDE MEMBRANES

This invention relates to the production of permeable membranes and more particularly to relatively thin metal oxide membranes free of bonding agents or cementing substances or unoxidized metal.

Prior to the present invention, metal oxide membranes useful for ion exchange had been prepared by various methods, for example, by forming a hydrous metal oxide from an aqueous solution, drying the precipitated oxide, adding a bonding agent or a cementing substance, and then pressing and sintering the product at relatively high temperatures. Another method involves the preparation of a porous supportive element to which hydrous metal oxide gel is incorporated into the pores of the support by either pressure or vacuum. Still another method involves the formation of a ceramic membrane which is activated by acid or alkali treatment or the use of high temperature, high pressure stream. Such membranes are described, for example, in U.S. Pat No. 3,346,422 to Berger. Still another method, described in U.S. Pat. No. 3,219,730, teaches the formation of a relatively thick oxide film membrane by flame spraying and then sintering, on a layer of salt that is later dissolved away from its base.

The present invention involves membranes and their preparation, in which the membranes are formed by electrolytic oxidation and are composed essentially of metal oxide only, and substantially free of extraneous substances such as bonding or cementing substances or even metal. An important feature of the invention resides in the fact that the membranes of the invention are exceptionally thin metal oxide films but nevertheless mechanically strong and of uniform porosity.

In the preparation of the membranes, tantalum or aluminum in the form of foil from about 600 to 2,500 microns thick is oxidized electrolytically to produce an oxide coating ranging from 300 A. to about 20,000 A. in thickness. For many purposes, a lower limit of about 1,000 A. is preferred. Foils of titanium, niobium, zirconium or vanadium or their inter-alloys will also provide oxides for the practice of this invention.

The electrochemical oxidation step is carried out using the selected metal as the anode. The cathode may comprise either the same metal or an inert conductive substance. The electrodes are immersed in a liquid and more or less aqueous electrolyte maintained at a selected pH which may be from about 3 to 9 although tantalum may be oxidized at virtually any pH and aluminum is preferably oxidized at a pH from about 6 to 9. Anodic oxidation is carried out at relatively low direct current voltages starting at about 0.5. volts with the voltage evantually reaching about 10 volts and maintained at that point until the particular thickness of oxide film has been formed. If a thicker and stronger film is desired, the voltage may be increased gradually to as high as 500 volts D.C. for tantalum or 1,000 volts D.C. for aluminum foil to produce a film of the maximum selected depth, namely, about 15,000 to 20,000 A. in thickness; the foils of titanium, niobium, zirconium, or vanadium, at a maximum voltage of 200 v., will produce films of about 3,000 A, maximum thickness.

The metallic anode selected for oxide formation may be in any desired shape that is contemplated or needed for the membrane's end use. Thus, the metal foil may be in sheet form of any practical dimensions depending on the use intended. The foil sheet may be either flat or curved, square, rectangular or round, or even in the form of a hollow cylinder. The starting foil may be as little as 50 microns thick (produced by vapor deposition) but preferably 600 microns thick up to about 2,500 microns in thickness as indicated previously.

The liquid electrolyte may comprise any known material in dilute solution capable of providing the proper ions. If a largely aqueous solution is contemplated, an inorganic acid of about 0.01 to 0.75 normality, using either hydrochloric, sulfuric or phosphoric acid, may be used. Salts of these acids as well as salts of organic acids may be used, particularly alkali metal salts of these acids, preferably providing lithium or potassium cations. Dilute ammonium salts in ethylene glycol, notably ammonium pentaborate may be used if aluminum foil, for example, is selected as the anode for oxide formation. Organic acids or salts furnishing acetate, citrate, or other mono- or poly-carboxylate anions may also be used in dilute form as suggested electrolytes. It should be understood, of course, that the electrolyte selected should not be such as to solubilize the oxide formed.

The electrolytic solution is maintained at a temperature conducive to optimum oxide formation and while room temperature is usually adequate, one may obtain satisfactory anodic oxidation if the electrolyte is held at any temperature range from about $-66°$ C. to about $200°$ C.

Following the formation of the oxide having the particular thickness selected, the next step involves the removal of the unoxidized metal without warping, deforming or tearing the metal oxide. This is carried out by immersing the oxidized anode in an alcoholic bromine solution saturated with bromine, preferrably using a lower alkanol such as methyl or ethyl alcohol. Other polar organic solvents are also useable, as for example, dimethylformamide. The water content of the solvent must be quite low, although traces of water will not interfere.

As an alternative procedure, the oxidized anode is taken out of the first oxidizing cell and immersed in an electrolytic cell in which it is the anode with another conductive substance as the cathode. The electrolyte is ammonium bromide in a concentration of 1.0 to 1.5 M in substantially anhydrous methanol or ethanol. When a direct current voltage of about 0.9 to about 1.0 volts is impressed on the oxidized anode, the metal foil beneath the oxide begins to dissolve away. It should be noted that the voltage impressed depends on the metal anode used and is adjusted to achieve a rate of solution without excessive heating or side effects, this being within the skill of the art. Current flow may be continued until all unoxidized metal has been removed from the original anode foil leaving only a permeable oxide film that is coherent and strong enough for use as an ionic exchange membrane, for example. Prior to use, the membrane may, if desired, be rinsed and dried.

The membranes may also be prepared and formed in situ at the place they are to be used so that further handling is not required. This is particularly valuable where the membranes are quite thin, for example, from 300 to 1,000 or so Angstrom units thick. Either of the methods described above may be followed for in situ preparations.

The final metal oxide membranes as produced by the methods described here are oxygen permeable and could be used in an oxygen sensor cell. They are also good transducers for certain ions, as for example, $H+$, $K+$, $Na+$, $Ca++$ and $NH_4+$ ions and are therefore useful for measuring ion concentration in a potentiometric cell. Additionally, they could be used as ion exchange membranes as suggested for the Berger membranes mentioned earlier. For the various uses indicated in this patent, the metal oxide membrane of the invention could be pretreated before use with acid as suggested there with respect to the sintered metal oxide membrane to make it an efficient cation exchanger, for example. The main advantages of the present membranes, however, because of their purity, thinness and porosity are in potentiometric or galvanic cells where rapid equilibrium and faster measurements are highly desirable, in electrodialysis cells and such other cells where these characteristics are particularly needed.

The following examples are given for illustrating the invention in greater detail.

EXAMPLE 1

Tantalum foils of 600 microns thickness were employed as both anode and cathode in an electrolytic cell. The electrolyte was aqueous phosphoric acid, approximately 0.01 N concentration and warmed to about $70°$–$80°$ C. Current was passed by slowly increasing the cell voltage until the desired thickness was produced, in this case 100 volts D.C.

The anode foil was then immersed in methanolic bromine solution of 1 M concentration until all metal had been removed. The remaining oxide film was about 3,000 A. thick.

The film thus formed was transparent and had the desirable characteristic of being flexible and mechanically strong. It could be supported on a tube and used for diffusion limited processes such as a cation exchanger.

The same procedure as described in Example 1 may be carried out using aluminum foil of 2,000 microns, and an electrolyte of 0.03 M $NH_4H_2PO_4$ in water essentially free of impurities.

EXAMPLE 2

Following the procedure of example 1, but impressing a voltage of only about 10 volts for about 30 minutes, an oxide film is formed on a tantalum anode foil. The metal-metal oxide foil is then rinsed and dried, and made the anode of another cell in which the electrolyte is 1.0 N ammonium bromide in anhydrous methanol, the cathode being tantalum foil on other inert support. A direct current of about 1.0 volts is passed until the foil beneath the oxide film has been eaten away. The tantalum oxide film remaining is extremely thin, not much more than 300 A. Such a membrane is particularly useful in a potentiometric cell.

The same procedure described in Example 2 may be carried out but forming a film of 1,000 A. thickness and operating with an electrolyte of 1.0 N LiCl in water.

EXAMPLE 3

A foil of titanium approximately 2,500 microns thick is made the anode in an electrolytic cell in which the electrolyte is 0.01 N aqueous phosphoric acid. A voltage (D.C.) is impressed and is gradually increased to about 200 v. at the end of 1 hour. The foil is removed and rinsed with water, dried, and immersed in 1 M methanolic bromine until the metal is dissolved to leave the oxide membrane. This relatively thin (about 1,000 A) membrane must be rinsed and handled with great care.

The same procedure will produce oxide films of similar thickness from foils of niobium, zirconium, or vanadium.

The invention claimed is:

1. The method of forming a metal oxide membrane comprising impressing a direct current voltage on a metal foil anode selected from the group consisting of a foil of tantalum, aluminum, titanium, niobium, zirconium, and vanadium, in an aqueous electrolyte to form an oxide coating having a thickness from about 300 to 20,000 A. and then removing substantially all of the unoxidized metal by chemical reaction in a substantially non-aqueous organic solvent to form a bromide of said unoxidized metal.

2. The process of claim 1, in which the metal anode is selected from the group consisting of foils of tantalum, aluminum, titanium, niobium, zirconium, and vanadium.

3. The process of claim 1, in which the metal anode is tantalum foil.

4. The process of claim 1, in which the metal anode is aluminum foil and the oxidation is carried out at a pH of about 6 to 9.

5. The process of claim 1, in which the aqueous electrolyte comprises phosphoric acid in 0.01 N concentration.

6. The process of claim 1, in which voltage is gradually increased as the oxide film is being formed.

7. The process of claim 1, in which the unoxidized metal is removed by reaction with bromine in a solution of a lower alcohol.

8. The process of claim 1, in which the oxide coated metal is made the anode in an electrolytic cell having ammonium bromide in anhydrous methanol as the electrolyte and impressing a direct current voltage on said anode thereby removing substantially all of the unoxidized metal.

9. The process of claim 8, in which the anode is tantalum oxide on tantalum foil.

* * * * *